United States Patent
Panthri

(10) Patent No.: US 12,545,246 B2
(45) Date of Patent: Feb. 10, 2026

(54) SYSTEMS AND METHODS FOR AVOIDING OBSTACLES IN A VIRTUALLY CONNECTED CONVOY

(71) Applicant: Toyota Motor Engineering & Manufacturing North America, Inc., Plano, TX (US)

(72) Inventor: Shaurya Panthri, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 67 days.

(21) Appl. No.: 18/469,031

(22) Filed: Sep. 18, 2023

(65) Prior Publication Data

US 2025/0091570 A1     Mar. 20, 2025

(51) Int. Cl.
*B60W 30/09* (2012.01)
*B60W 30/095* (2012.01)
*B60W 30/165* (2020.01)
*B60W 60/00* (2020.01)

(52) U.S. Cl.
CPC .......... *B60W 30/09* (2013.01); *B60W 30/165* (2013.01); *B60W 30/0956* (2013.01); *B60W 60/0016* (2020.02); *B60W 60/0027* (2020.02); *B60W 2554/80* (2020.02)

(58) Field of Classification Search
CPC ............... B60W 30/09; B60W 30/165; B60W 30/0956; B60W 60/0016; B60W 60/0027; B60W 2554/80
See application file for complete search history.

(56) References Cited

U.S. PATENT DOCUMENTS

| | | | |
|---|---|---|---|
| 11,505,190 B2 | 11/2022 | Wilberg et al. | |
| 11,669,108 B2 | 6/2023 | Laws et al. | |
| 2010/0026555 A1 | 2/2010 | Whittaker et al. | |
| 2013/0093583 A1 | 4/2013 | Shapiro | |
| 2019/0286163 A1* | 9/2019 | Yasuda ................ | B60W 30/16 |
| 2020/0057453 A1 | 2/2020 | Laws et al. | |
| 2021/0129843 A1 | 5/2021 | George et al. | |
| 2021/0294351 A1 | 9/2021 | Wilberg et al. | |
| 2022/0058955 A1 | 2/2022 | Park | |

(Continued)

FOREIGN PATENT DOCUMENTS

| | | |
|---|---|---|
| CN | 111290400 B | 5/2022 |
| CN | 115662188 A | 1/2023 |

(Continued)

OTHER PUBLICATIONS

Extended European Search Report for European patent application No. 24201050.2, Mailed Jan. 30, 2025. (37 pages).

*Primary Examiner* — Dylan M Katz
(74) *Attorney, Agent, or Firm* — Christopher G. Darrow; Darrow Mustafa PC

(57) ABSTRACT

Systems, methods, and other embodiments described herein relate to improving obstacle avoidance for a virtually connected convoy of vehicles. In one embodiment, a method includes detecting an obstacle in a path of a convoy, determining that a vehicle in the convoy is to execute obstacle avoidance based on a property of the vehicle and a physical property of the obstacle, and disengaging a following mode of the convoy responsive to a determination that the vehicle is to execute obstacle avoidance.

20 Claims, 6 Drawing Sheets

(56) References Cited

U.S. PATENT DOCUMENTS

2022/0317700 A1    10/2022  Stein et al.
2023/0169871 A1*    6/2023  Wang ........................ B60T 7/22
                                                          701/96

FOREIGN PATENT DOCUMENTS

| CN | 116001779 A    |   | 4/2023  |         |
|----|----------------|---|---------|---------|
| DE | 102018217561 B3 | * | 12/2019 | ............. H04W 4/46 |
| EP | 3791240 B1     |   | 3/2021  |         |
| WO | 2022266061 A1  |   | 12/2022 |         |

* cited by examiner

SYSTEMS AND METHODS FOR AVOIDING OBSTACLES IN A VIRTUALLY CONNECTED CONVOY

TECHNICAL FIELD

The subject matter described herein relates, in general, to managing virtually connected convoys and, more particularly, to executing obstacle avoidance for vehicles in a virtually connected convoy.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as autonomous driving systems can perceive the noted aspects and accurately plan and navigate accordingly. As one particular example, this sensor data may be used to detect obstacles in a vehicle's path. A vehicle system may warn a driver of the obstacle or autonomously navigate the vehicle around the obstacle.

In general, further enhancements to obstacle avoidance systems may improve the safety of vehicular travel, specifically in the context of obstacle avoidance for virtually connected vehicles.

SUMMARY

In one embodiment, example systems and methods relate to a manner of improving obstacle avoidance for virtually connected vehicle convoys.

In one embodiment, a convoy management system for directing virtually connected vehicles to avoid an obstacle is disclosed. The convoy management system includes one or more processors and a memory communicably coupled to the one or more processors. The memory stores instructions that, when executed by the one or more processors, cause the one or more processors to detect an obstacle in a path of a convoy and determine that a vehicle in the convoy is to execute obstacle avoidance based on a property of the vehicle and a physical property of the obstacle. The memory also stores instructions that, when executed by the one or more processors, cause the processor to disengage a following mode of the convoy responsive to a determination that the vehicle is to execute obstacle avoidance.

In one embodiment, a non-transitory computer-readable medium for directing virtually connected vehicles to avoid an obstacle and including instructions that, when executed by one or more processors, cause the one or more processors to perform one or more functions is disclosed. The instructions include instructions to detect an obstacle in a path of a convoy and determine that a vehicle in the convoy is to execute obstacle avoidance based on a property of the vehicle and a physical property of the obstacle. The instructions also include instructions to disengage a following mode of the convoy responsive to a determination that the vehicle is to execute obstacle avoidance.

In one embodiment, a method for directing virtually connected vehicles to avoid an obstacle is disclosed. In one embodiment, the method includes detecting an obstacle in a path of a convoy and determining that a vehicle in the convoy is to execute obstacle avoidance based on a property of the vehicle and a physical property of the obstacle. The method also includes disengaging a following mode of the convoy responsive to a determination that the vehicle is to execute obstacle avoidance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
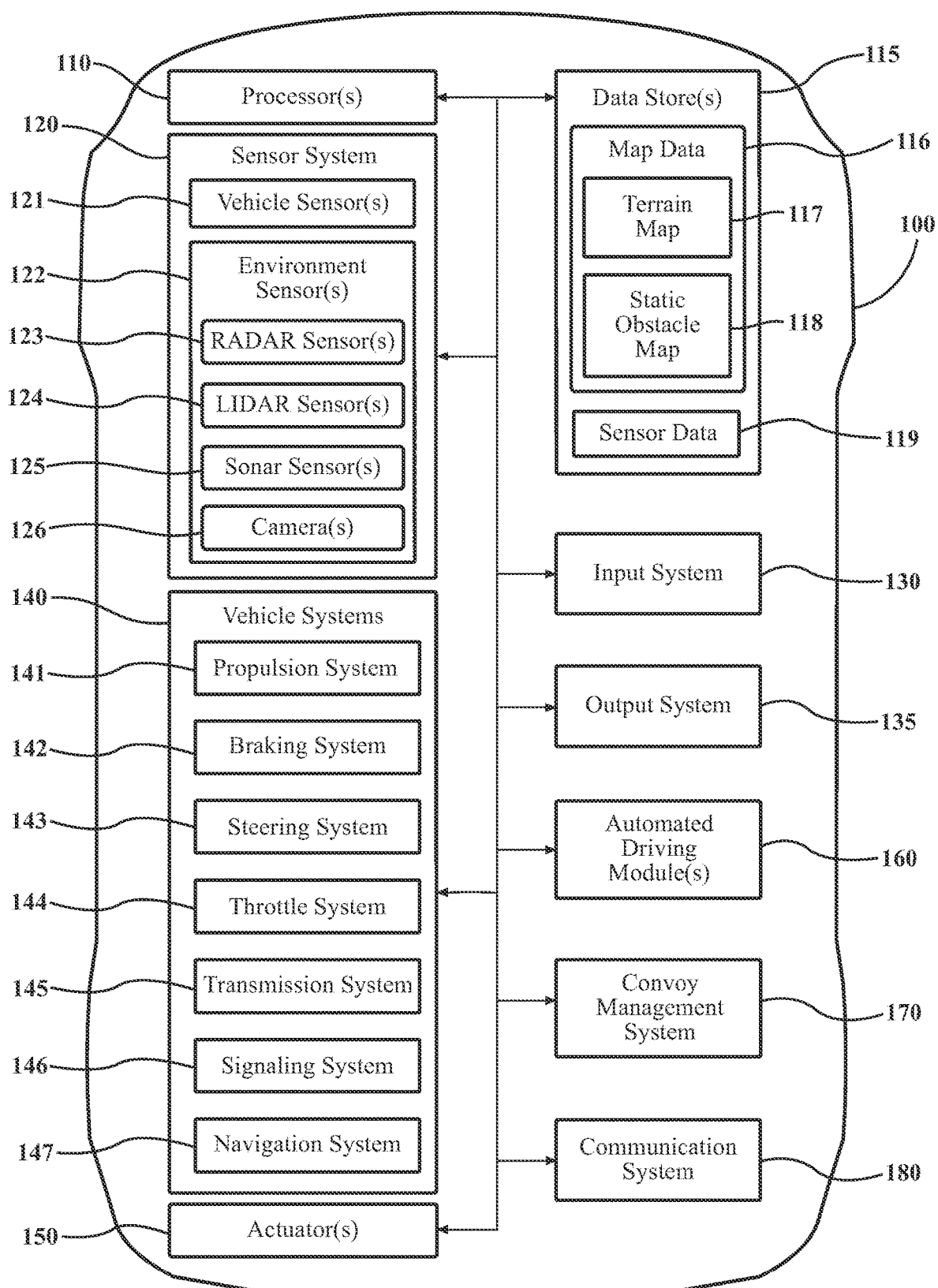
FIG. 1 illustrates one embodiment of a vehicle within which systems and methods disclosed herein may be implemented.

Systems, methods, and other embodiments associated with improving obstacle avoidance in a virtually connected convoy of vehicles are disclosed herein. In a virtual convoy, a hitchless towing, a virtual towing, a platooning, or a virtual connection configuration, a lead vehicle is manually or autonomously controlled, while a following vehicle is at least partially controlled by the lead vehicle. For example, a lead vehicle at the front of the convoy controls the speed and/or maneuvers of other vehicles in the convoy, and a following vehicle trails the lead vehicle as if physically coupled to the lead vehicle. As such, the following vehicle and the lead vehicle exhibit coordinated movements.

Vehicles, whether they be autonomous, semi-autonomous, or manual, encounter obstacles in a travel path. Drivers of manually controlled vehicles control the vehicle to avoid obstacles, while semi-autonomous and autonomous vehicles rely on some degree of automation to avoid the obstacles. Many vehicles are equipped with obstacle avoidance systems that either warn a driver of an obstacle in a travel path or take control of the vehicle to avoid the obstacle. However, obstacle avoidance becomes complicated when the following vehicle is virtually connected (i.e., connected without a physical connection) to a lead vehicle.

For example, it may be that different vehicles in a convoy have different ground clearances. A lead vehicle in the convoy may maintain a particular trajectory towards, and not avoid, an object with a height less than the lead vehicle's ground clearance. However, the obstacle may be taller than the body of a following vehicle. Because the lead vehicle does not alter its path to avoid the obstacle, the following vehicle which trails the lead vehicle, may collide with the obstacle in the road. This may damage the vehicle and potentially endanger the passengers in the following vehicle. As another example, the lead vehicle may follow an obstacle avoidance path that the following vehicle cannot easily traverse. For example, a lead vehicle may have a tighter high-speed turning radius than a following vehicle. For an encountered obstacle on a curve, the lead vehicle may navigate a tighter turn to pass by the inside of the obstacle. A larger following vehicle may be unable to navigate the tighter turn traveled by the lead vehicle.

In summary, the lead vehicle and the following vehicle in a convoy may have different dimensions/abilities, which result in situations where both vehicles 1) do not need to avoid the same obstacles or 2) do not need to avoid the obstacles in the same manner. Accordingly, the present specification describes a system that accounts for the individual abilities/dimensions of each vehicle in a convoy when selecting an obstacle avoidance strategy.

Specifically, the convoy management system of the present invention disclosure identifies obstacles in the path of the convoy by receiving sensor data collected from sensors (e.g., cameras, radar, LIDAR, etc.) of a lead vehicle. Obstacles may include potholes, other vehicles, pedestrians, rocks, boulders, etc. The convoy management system determines whether the lead and/or following vehicle should avoid the obstacles based on the dimensions (e.g., width, height, length, ground clearance, wheelbase, etc.) and abilities (e.g., braking abilities, acceleration abilities, turning radius, etc.) of each vehicle individually. If, based on the characteristics of the upcoming obstacle (e.g., size, location, depth, etc. of the object) and the dimensions/abilities of the vehicles, one of the vehicles should maneuver to avoid the obstacle, the convoy management system disengages a following mode of the convoy such that just the vehicle(s) that need to avoid the obstacle perform obstacle avoidance maneuvers. For example, suppose the upcoming obstacle is a rock that is shorter than the ground clearance of the lead vehicle but taller than the ground clearance of the following vehicle. In this case, the convoy management system allows the lead vehicle to continue on its path over the rock but also allows the following vehicle to alter its path to avoid the rock.

Obstacle avoidance may include rerouting the following vehicle along a different path from the lead vehicle. That is, if multiple vehicles are to avoid the obstacle (e.g., a pothole or a stopped vehicle), the convoy management system may disengage the following mode of the convoy so that the different vehicles take independent paths to avoid the obstacle. In either case, the convoy management system disengages the following mode of the convoy such that each vehicle in the convoy may independently navigate an obstacle in the path of the convoy.

After the convoy has passed the obstacle, the convoy management system realigns the following vehicle with the lead vehicle and re-establishes the following mode. In this way, the disclosed systems, methods, and other embodiments improve obstacle avoidance for virtually connected convoys by disengaging a following mode of the convoy such that each vehicle may individually avoid an obstacle based on the particular properties of the vehicle.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with managing a virtually connected convoy of vehicles to avoid an obstacle.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a convoy management system 170 that is implemented to perform methods and other functions as disclosed herein relating to improving the control of virtually connected convoys of vehicles to avoid obstacles in the path of the convoy.

As will be discussed in greater detail, the convoy management system 170, in various embodiments, is implemented partially within the vehicle 100, and as a cloud-based service. For example, in one approach, functionality associated with at least one module of the convoy management system 170 is implemented within the vehicle 100 while further functionality is implemented within a cloud-based computing system. Thus, the convoy management system 170 may include a local instance at the vehicle 100 and a remote instance that functions within the cloud-based environment.

Moreover, the convoy management system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the convoy management system 170 can leverage various wireless communication technologies to provide communications to other entities, such as members of the cloud-computing environment.

Figure 2:
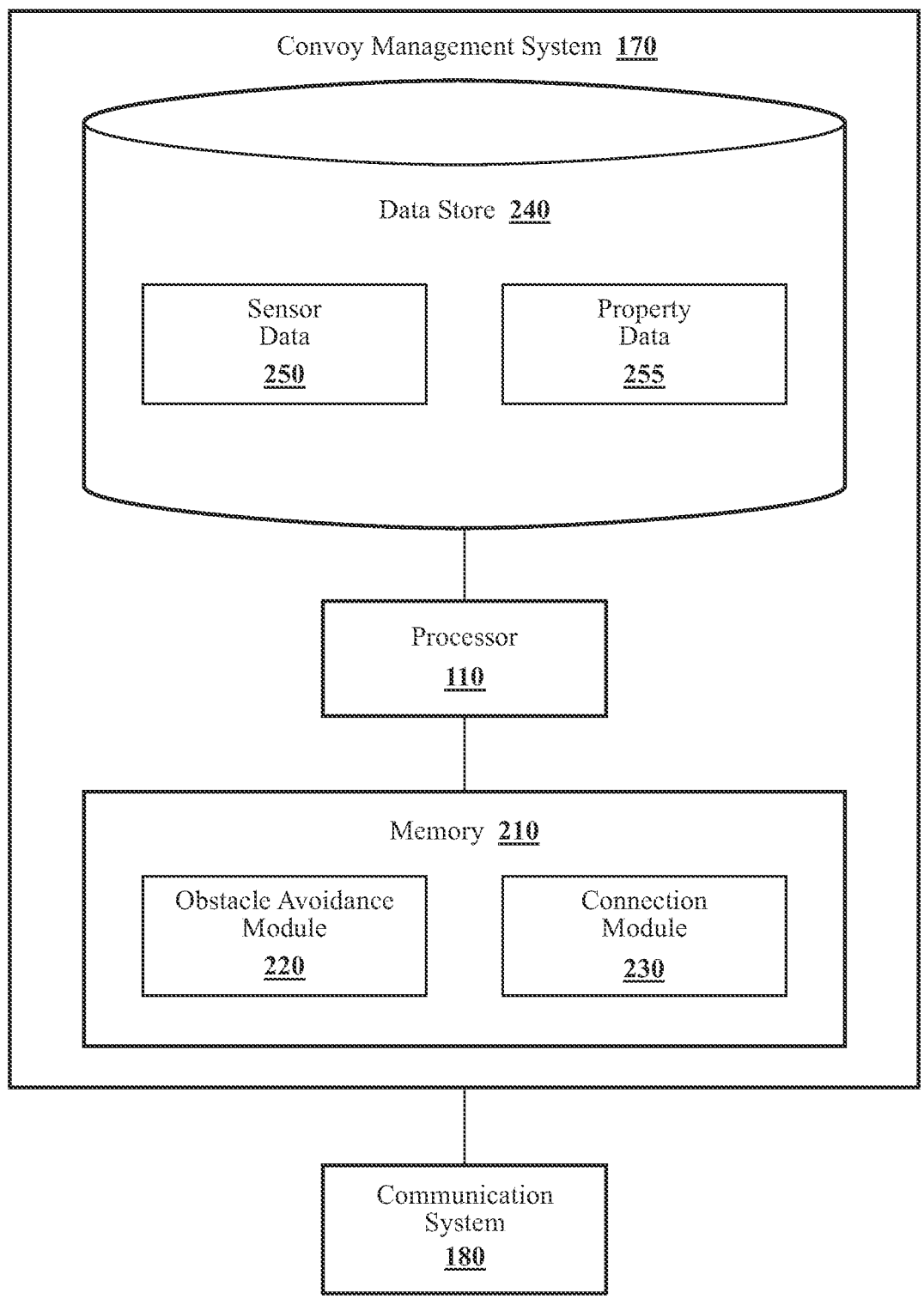
FIG. 2 illustrates one embodiment of a convoy management system that is associated with directing virtually connected vehicles to avoid an obstacle.

With reference to FIG. 2, one embodiment of the convoy management system 170 of FIG. 1 is further illustrated. The convoy management system 170 is shown as including a processor 110 from the vehicle 100 of FIG. 1. Accordingly, the processor 110 may be a part of the convoy management system 170, the convoy management system 170 may include a separate processor from the processor 110 of the vehicle 100, or the convoy management system 170 may access the processor 110 through a data bus or another communication path that is separate from the vehicle 100. In one embodiment, the convoy management system 170 includes a memory 210 that stores an obstacle avoidance module 220 and a connection module 230. The memory 210 is a random-access memory (RAM), read-only memory (ROM), a hard-disk drive, a flash memory, or another suitable memory for storing the modules 220 and 230. The modules 220 and 230 are, for example, computer-readable instructions that when executed by the processor 110 cause the processor 110 to perform the various functions disclosed herein. In alternative arrangements, the modules 220 and 230 are independent elements from the memory 210 that are, for example, comprised of hardware elements. Thus, the modules 220 and 230 are alternatively ASICs, hardware-based controllers, a composition of logic gates, or another hardware-based solution.

Moreover, in one embodiment, the convoy management system 170 includes the data store 240. The data store 240 is, in one embodiment, an electronic data structure stored in the memory 210 or another data storage device and that is configured with routines that can be executed by the processor 110 for analyzing stored data, providing stored data, organizing stored data, and so on. Thus, in one embodiment, the data store 240 stores data used by the modules 220 and 230 in executing various functions.

In one embodiment, the data store 240 stores the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the sensor data 250 includes data collected by the vehicle sensor system(s) 120. The sensor data 250 may include observations of a surrounding environment of the vehicle 100 and/or information about the vehicle 100 itself. That is, in various configurations, the sensor system 120 includes one or more environment sensors 122 and/or one or more vehicle sensors 121. Various examples of different types of sensors will be described herein. However, it will be understood that the embodiments are not limited to the particular sensors described.

The environment sensors 122 sense a surrounding environment (e.g., external) of the vehicle 100 and/or, in at least one arrangement, an environment of a passenger cabin of the vehicle 100. For example, the one or more environment sensors 122 sense objects in the surrounding environment of the vehicle 100. Such obstacles may be stationary objects and/or dynamic objects. Various examples of environment sensors 122 will be described herein, however, it will be understood that the embodiments are not limited to the particular sensors described. As an example, in one or more arrangements, the environment sensors 122 include one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

The environment sensor 122 output is used by the obstacle avoidance module 220 to detect obstacles in the path of the convoy that are to be avoided by at least one vehicle in the convoy. As such, the sensor data 250 includes at least camera images of the surrounding environment, including the objects within the environment. In further arrangements, the sensor data 250 includes output from a radar sensor 123, a LIDAR sensor 124, and other sensors as may be suitable for identifying objects in the travel path of the convoy.

As another example, the sensor data 250 includes images or other sensor output identifying vehicles in the vicinity of the vehicle 100. For example, after the convoy has navigated past an identified obstacle, it may be desirable to re-establish the following mode so that the following vehicle may again follow the path of the lead vehicle. In this example, the sensor data 250 of the lead vehicle and the following vehicle may be used to identify the position of one another such that the following vehicle may align itself behind the lead vehicle. For example, the sensor data 250 of the lead vehicle may include images of the following vehicle such that the operation of the lead vehicle and/or following vehicle may be altered to align the vehicles in a desired fashion. Additional details regarding the re-engagement of the following mode of the convoy are provided below in connection with FIG. 5.

The sensor data 250 also includes data from the vehicle sensor(s) 121, which function to sense information about the vehicle 100 itself. In some examples, the obstacle avoidance module 220 relies on vehicle sensor 121 information to determine whether vehicles in the convoy can safely traverse an obstacle without path alteration or whether vehicles in the convoy should execute obstacle avoidance. As a particular example, a vehicle may be loaded with heavy cargo such that the ground clearance is reduced. In another example, a vehicle may be connected to a trailer, which reduces the vehicle's ability to quickly change lanes to avoid an obstacle. Vehicle sensors 121 of the sensor system 120 may detect these different characteristics of the vehicles such that an obstacle avoidance recommendation is particularly tailored to the vehicles in the convoy.

In these and other examples, the sensor data 250 includes vehicle sensor 121 data by which the dimensions/capabilities of the vehicle may be determined. In one or more arrangements, the vehicle sensor(s) 121 include one or more accelerometers, one or more gyroscopes, one or more weight sensors, one or more component sensors, an inertial measurement unit (IMU), a dead-reckoning system, a global navigation satellite system (GNSS), a global positioning system (GPS), and/or other sensors for monitoring aspects about the vehicle 100.

In an example, the sensor data 250 includes vehicle sensor 121 data for multiple vehicles. That is, as described above, the convoy management system 170 determines whether any vehicle in the convoy should engage in obstacle avoidance. In this example, the convoy vehicles may share such information via the respective communication systems 180 of the vehicles. As such, the sensor data 250 includes sensor output from which vehicle dimensions/capabilities may be determined.

As yet another example, the vehicle sensor 121 data and the environment sensor 122 data may be used to determine the pose of the vehicles in the convoy. For example, it may be that different vehicles are aligned differently in the lanes of a roadway. The different positions of the vehicle may dictate different obstacle avoidance maneuvers. An example of vehicle pose dictating different obstacle avoidance maneuvers is depicted below in FIG. 4.

In one embodiment, the data store 240 further includes property data 255, which indicates the properties, dimensions, capabilities, etc., of the vehicles in the convoy. As described above, the property data 255 may provide context for which the obstacle avoidance module 220 determines whether to avoid a particular obstacle. The property data 255 may include any number of identifying characteristics of the vehicles in the convoy, including information indicating the capability and/or state of the vehicle systems 140. For example, the properties of vehicles may include a dimension of the vehicle (e.g., ground clearance, length, width, height, wheelbase, etc.), an operational capability of the vehicle (e.g., braking capabilities, acceleration capabilities, steering capabilities, turning radius, etc.), or other information relating to the dimensions and/or capabilities of the vehicle. While particular reference is made to particular types of property data 255, other types of property data 255 may be stored in the data store 240.

In an example, the property data 255 includes property data 255 for multiple vehicles. That is, as described above, the convoy management system 170 determines whether any vehicle in the convoy should engage in obstacle avoidance. In this example, the convoy vehicles may share such information via the respective communication systems 180 of the vehicles. In an example, the property data 255 from other vehicles is transmitted to the lead vehicle during the initialization of a convoy relationship. That is, during the initialization of a convoy, a communication path is established between the lead vehicle and the following vehicle wherein certain information, such as vehicle identifiers, etc., is transmitted between the different vehicles in the convoy such that the vehicles may communicate and/or control one another. During this initialization, the connection module 230 may collect data indicating the properties of the vehicles in the convoy, which properties are used to determine whether any vehicle should engage in obstacle avoidance given the physical properties of the obstacle.

The convoy management system 170 includes an obstacle avoidance module 220, which, in one embodiment, includes instructions that cause the processor 110 to detect an obstacle in a path of a convoy and determine that a vehicle in the convoy is to execute obstacle avoidance based on a property of the vehicle and a physical property of the obstacle. That is, the obstacle avoidance module 220 determines whether certain vehicles in the convoy can safely traverse a detected obstacle or whether obstacle avoidance should be executed.

As the obstacle avoidance module 220 identifies and classifies objects in the travel path of the convoy, the obstacle avoidance module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the obstacle avoidance module 220, in one embodiment, acquires sensor data 250 that includes at least camera images of objects in the environment proximate to the vehicle 100. In further arrangements, the obstacle avoidance module 220 acquires the sensor data 250 from further sensors such as a radar sensor 123, a LIDAR sensor 124, and other sensors as may be suitable for identifying vehicles and locations of the vehicles.

Accordingly, the obstacle avoidance module 220, in one embodiment, controls the respective sensors to provide the data inputs in the form of the sensor data 250. Additionally, while the obstacle avoidance module 220 is discussed as controlling the various sensors to provide the sensor data 250, in one or more embodiments, the obstacle avoidance module 220 can employ other techniques to acquire the sensor data 250 that are either active or passive. For example, the obstacle avoidance module 220 may passively sniff the sensor data 250 from a stream of electronic information provided by the various sensors to further components within the vehicle 100. Moreover, the obstacle avoidance module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

The sensor data 250 may include, for example, information about obstacles in the vicinity of the convoy and so on. Moreover, the obstacle avoidance module 220, in one embodiment, controls the sensors to acquire the sensor data 250 about an area that encompasses 360 degrees about the vehicle 100 in order to provide a comprehensive assessment of the surrounding environment. Of course, in alternative embodiments, the obstacle avoidance module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

In addition to detecting obstacles in the travel path of the convoy, the obstacle avoidance module 220 identifies the physical properties of the obstacles such that a determination may be made as to whether vehicles in the convoy should activate obstacle avoidance systems. As such, the obstacle avoidance module 220 may include an image processor or other sensor output processor that can extract the physical properties of a detected object from a camera image or other sensor output. Examples of physical properties of an obstacle include a dimension of the obstacle, a position of the obstacle, or a movement of the obstacle.

The obstacle avoidance module 220 also acquires the dimension/capability properties of the vehicles in the convoy to determine whether any vehicle should execute obstacle avoidance measures. Examples of properties of the vehicles in the convoy include a dimension of the vehicle, an operational capability of the vehicle, or a position of the vehicle. As described above, the vehicle property information may be determined from 1) the property data 255 collected from the vehicles in the convoy via the communication system 180 and/or 2) the sensor data 250 collected by vehicles in the convoy. As such, the obstacle avoidance module 220 generally includes instructions that function to control the processor 110 to retrieve property data 255 from the data store 240 in addition to the retrieval of the sensor data 250 previously described.

The dimensions/capabilities of the vehicles in the convoy may be further determined based on sensor data 250 collected by the vehicles. For example, property data 255 for a particular vehicle may indicate that the following vehicle has a particular turning radius. However, sensor data 250 may indicate the following vehicle is attached to a trailer, the configuration of which alters the turning radius, braking capabilities, and other operational capabilities of the following vehicle. In other words, sensor data 250 may be relied on to alter a default dimension/capability of the vehicle as indicated in the property data 255 for the vehicle. As such, both the property data 255 and the sensor data 250 may be used to determine the operational capabilities of the vehicles in the convoy.

Based on the sensor data 250 and the property data 255, the obstacle avoidance module 220 determines, for each vehicle in the convoy, whether the vehicle can safely traverse the obstacle or whether obstacle avoidance measures should be engaged to bypass the obstacle. Specifically, the obstacle avoidance module 220 compares the dimension, position, and/or movement of the obstacle with the dimension, position, and/or operational capability of each vehicle in the convoy. As an example, the obstacle avoidance module 220 may identify a rock in the travel path of the vehicle that has a height of 12 inches. In this example, property data 255 for a lead vehicle may indicate that the lead vehicle has a ground clearance of 18 inches and can thus safely traverse over the rock. By comparison, property data 255 may indicate that the following vehicle has a ground clearance of 10 inches and should thus alter a travel path to avoid the obstacle.

As another example, the obstacle avoidance module 220 may identify a stopped vehicle 50 feet in front of the convoy. Based on property data 255, and potentially sensor data 250, the obstacle avoidance module 220 may determine that a lead vehicle can safely stop in this distance while a following vehicle, which is larger and towing a trailer, cannot and should thus activate obstacle avoidance.

In yet another example, the obstacle avoidance module 220 may identify an obstacle on a curve of a road the convoy is traveling. In any case, the obstacle avoidance module 220 identifies whether any vehicle in the convoy should activate a vehicle-specific obstacle avoidance system to avoid an obstacle in the path of the convoy. This determination is passed to the connection module 230, which disengages a following mode of the convoy such that each vehicle may independently navigate past the obstacle based on its distinct dimensions and/or capabilities.

In an example, the obstacle avoidance module 220 may also generate and transmit an obstacle avoidance message. Such a message may take various forms, including 1) an identification of the obstacle and its physical properties, 2) a guidance suggestion for avoiding the obstacle, and 3) an autonomous command to avoid the obstacle. That is, in addition to identifying whether obstacle avoidance should be executed, the obstacle avoidance module 220 may initialize obstacle avoidance in any number of ways. Note that the generated message may be transmitted, via the respective communication systems 180 of the vehicles, to the vehicle that is to engage in obstacle avoidance following disengagement of the following mode of the convoy. That is, even when the following mode of the convoy is disengaged, the vehicles in the convoy may still communicate with one another.

In an example, the obstacle avoidance module 220 may cause the processor 110 to transmit the physical property of the obstacle to the following vehicle such that the following vehicle may execute obstacle avoidance based on the property of the following vehicle. That is, in this example, the following vehicle includes an obstacle avoidance system and includes a data store indicating the dimensions/capabilities of the following vehicle. In this example, the following vehicle receives the physical properties of the obstacle. Following disengagement of the following mode of the convoy, the following vehicle executes its own obstacle avoidance measures (e.g., deceleration, lateral movement, etc.) to avoid the obstacle based on the following vehicle's properties (i.e., dimensions, capabilities, position, etc.). As a particular example, the obstacle avoidance module 220 of the lead vehicle may transmit a message to the following vehicle that a stopped vehicle is 50 feet in front of the convoy. Following disengagement and given property data 255 indicating the following vehicle cannot stop within 50 feet, the following vehicle may provide driver navigation, or autonomously guide the vehicle, to pull to a side of the roadway.

In another example, the obstacle avoidance module 220 may transmit an obstacle avoidance guidance/recommendation to the relevant vehicle. For example, rather than simply noting the detected obstacle, the convoy management system 170 may transmit the guidance, which may be based on the properties of the vehicle and the physical properties of the obstacle, to the following vehicle, which may then be presented to a driver via, for example, audio output, visual output, or otherwise.

As yet another example, the obstacle avoidance module 220 may cause the processor 110 to transmit obstacle avoidance commands to the following vehicle based on a property of the following vehicle. That is, the obstacle avoidance module 220 may generate obstacle avoidance commands for the following vehicle based on the property of the following vehicle and the physical property of the obstacle. In this example, the convoy management system 170, via the communication system 180, may transmit the autonomous obstacle avoidance command to the following vehicle such that the automated driving system of the following vehicle may control the vehicle systems 140 in accordance with the autonomous obstacle avoidance command to navigate past the obstacle safely.

Note that in either example of providing obstacle avoidance assistance (e.g., a warning message or autonomous command) to the following vehicle, the obstacle avoidance commands transmitted to the following vehicle may differ from those executed by the lead vehicle in the convoy. This is due to the different dimensions/properties of the vehicles. For example, a lead vehicle may have a tighter turn radius and may thus be able to turn towards an inside portion of a curved road with an obstacle. In contrast, the autonomous obstacle avoidance command for a following vehicle that cannot turn as tightly may direct the following vehicle to increase a turn radius towards an outside portion of the curved road. As another example, a lead vehicle may heavily apply brake pressure due to a detected stopped vehicle in front of the convoy. By comparison, a following vehicle that does not have as great a braking capability may be instructed/guided to pull over to the shoulder of the road to avoid collision with the vehicle in front.

Note that in any of these examples, the obstacle avoidance message may be targeted to a vehicle of the convoy that is to execute obstacle avoidance. That is, it may be that certain vehicles do not need to activate their respective obstacle avoidance systems based on the physical properties of the obstacle and the properties of the vehicle. In this example, the obstacle avoidance message is not transmitted to these vehicles, and the following mode may be maintained for these vehicles. As such, the obstacle avoidance module 220 prescribes individualized obstacle avoidance strategies for each vehicle in a convoy rather than implementing a single obstacle avoidance strategy that is perhaps inefficient, dangerous, or impossible for some of the vehicles in the convoy. That is, the present convoy management system 170 provides a customized and robust obstacle avoidance system for a vehicle convoy.

In one approach, the obstacle avoidance module 220 implements and/or otherwise uses a machine learning algorithm. In one configuration, the machine learning algorithm is embedded within the obstacle avoidance module 220, such as a convolutional neural network (CNN), to perform obstacle detection, obstacle avoidance recommendation, and obstacle avoidance execution based on the sensor data 250 and property data 255 from which further information is derived. Of course, in further aspects, the obstacle avoidance module 220 may employ different machine learning algorithms or implement different suitable approaches for generating an obstacle avoidance recommendation and execution. Whichever particular approach the obstacle avoidance module 220 implements, the obstacle avoidance module 220 provides an output with property-based avoidance recommendations. In this way, the obstacle avoidance module provides improved and individualized obstacle avoidance for each vehicle in a virtually connected convoy.

Figure 3:
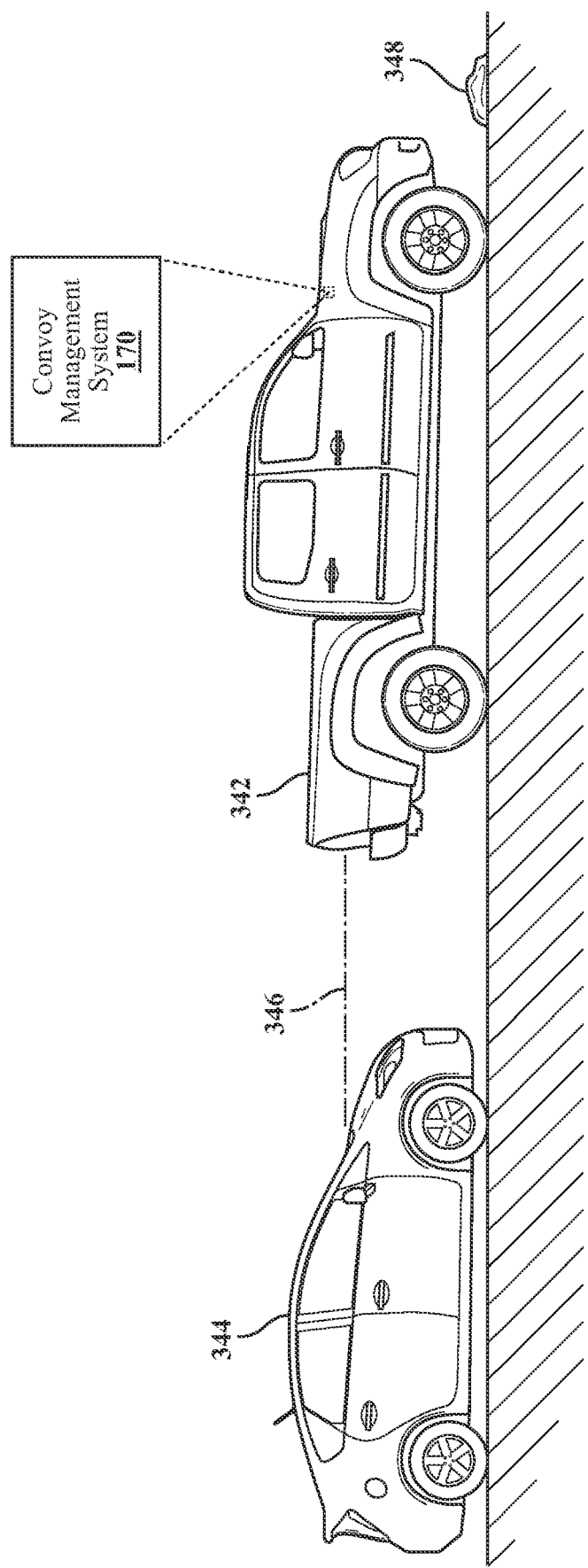
FIG. 3 illustrates a vehicle convoy and a convoy management system that is associated with directing the convoy to avoid an obstacle.

The convoy management system 170 includes a connection module 230 which, in one embodiment, includes instructions that cause the processor 110 to disengage a following mode of the convoy responsive to a determination that the vehicle is to execute obstacle avoidance. That is, complications may arise when obstacle avoidance is universally executed amongst every vehicle in a convoy without consideration of the vehicle-specific dimensions or capabilities. For example, a lead vehicle may detect an obstacle that the lead vehicle can safely traverse without altering course due to the lead vehicle ground clearance being greater than the height of the obstacle. A following vehicle, however, may have a lower ground clearance that is not greater than the height of the obstacle. As the following vehicle follows the path of the lead vehicle and the lead vehicle has not deviated its course, the following vehicle may strike the obstacle. This example is depicted in FIG. 3 below. In another example, the lead vehicle may take an obstacle avoidance path that is not easily traversed by the following vehicle. For example, a lead vehicle may quickly swerve to avoid an obstacle. A following vehicle, which is towing a trailer, may not be able to safely swerve as the lead vehicle did due to the dynamics of trailering. For these and other reasons, the connection module 230 disengages the following mode so that each vehicle in the convoy may independently avoid the obstacle based on the vehicle-specific dimensions and capabilities.

As such, the connection module 230 is communicatively coupled to the obstacle avoidance module 220 and receives an indication that at least one vehicle in the convoy is to execute obstacle avoidance based on properties of the at least one vehicle and the physical properties of the obstacle to be avoided. Based on such an indication, the connection module 230 disengages the following mode of the convoy. That is, the connection module 230 disengages the relationship between the lead vehicle and the following vehicle where the following vehicle follows the path of the lead vehicle.

This disengagement may take a variety of forms. For example, it may be that a lead vehicle controller transmits commands to the vehicle systems of the following vehicle. In this example, disengagement of the following mode of the convoy may include a handoff operation where control of the vehicle systems of the following vehicle is transferred from the lead vehicle to the following vehicle. As used herein, control of the vehicle systems of the following vehicle may be via driver input or an automated driving module. That is, a driver may manually operate the vehicle systems 140, or an automated driving module 160 may operate the vehicle systems. A notification may accompany the disengagement command so that a driver or autonomous driving system is aware of the handoff.

In another example, the following commands may originate from the following vehicle, which may have a controller that tracks the lead vehicle and directs the following vehicle along a path of the lead vehicle. In this example, disengagement of the following mode includes handing off control of the vehicle systems 140 from the following module to a driver or an automated driving module of the following vehicle. Note that while particular reference is made to particular handoff procedures, other handoff operations may be executed wherein the ultimate result is that the following vehicle, and not the lead vehicle, is responsible for control of the position and movement of the vehicle.

Note that even when the following mode is disengaged, the following vehicle and the lead vehicle remain communicatively coupled. That is, information may still be shared between the two vehicles via the respective communication systems 180. However, the following vehicle does not follow the lead vehicle as if physically attached. Note that if an obstacle is detected, but no obstacle avoidance is triggered for any vehicle (e.g., for example, due to the obstacle being in a different lane than any vehicle in the convoy or smaller than the ground clearance of any vehicle in the convoy), the following mode of the convoy is maintained, and the following vehicle continues to follow the path of the lead vehicle.

Following disengagement, each vehicle may be independently responsible for its own movement. That is, the position of a disengaged following vehicle is not tied to the position of the lead vehicle with which it previously shared a following relationship. Following disengagement, the following vehicles may operate to avoid a detected obstacle, with differing amounts of reliance on information transmitted from the lead vehicle. For example, a lead vehicle may transmit the physical properties of the obstacle, in which case the following vehicle generates and executes obstacle avoidance procedures. In another example, the lead vehicle may transmit navigation guidance or automated commands for obstacle avoidance. In this example, the following vehicle may display the navigation guidance or execute the automated commands for obstacle avoidance. In any example (i.e., the lead vehicle transmits the physical properties of the obstacle or guidance/automated driving commands), the obstacle avoidance executed by the following vehicle may be unique to the following vehicle and based on the dimensions and capabilities of the following vehicle.

In an example, the connection module 230 includes instructions that, when executed by the processor 110, cause the processor to, when the convoy has passed the obstacle, re-engage the following mode of the convoy. That is, the intent of the disengagement is to temporarily bypass the following mode to allow the vehicles to efficiently navigate an obstacle in the path of a convoy. When the danger presented by the obstacle has been resolved, it may be desirable to re-establish the following mode so that the following vehicle follows the lead vehicle again. Returning to the examples described above, such re-engagement may include handing off control of the vehicle systems 140 of the following vehicle from a driver or automated driving module of the following vehicle to 1) a following module of a following vehicle, 2) a controller of the lead vehicle, or 3) any other system which effectuates virtual convoying.

As re-engagement may be triggered when the convoy has passed the obstacle, the connection module 230 includes instructions that function to control the processor 110 to receive data inputs from one or more sensors of the vehicle 100 and to receive data inputs from one or more sensors of other vehicles via the communication system 180. In one embodiment, the inputs are observations of the obstacle for which the vehicles disengaged a following mode to avoid. For example, the environment sensor 122 of the lead vehicle and the following vehicle may track the obstacle through various collected images. When the obstacle is no longer identified by the environment sensors 122 of the lead vehicle or the following vehicle, the connection module 230 may initiate the re-engagement operation. As another example, the convoy management system 170 may calculate a predicted time when the convoy will have passed the obstacle based on the relative position of the obstacle to the convoy and the speed of the vehicles in the convoy. In either case, after determining that the convoy has passed the obstacle, the connection module 230 may re-engage the following mode.

As re-engagement may be based on sensor data 250, the connection module 230, in one embodiment, acquires sensor data 250 that includes at least camera images of the object. In further arrangements, the connection module 230 acquires the sensor data 250 from further sensors such as a radar sensor 123, a LIDAR sensor 124, and other sensors as may be suitable for identifying the object.

Accordingly, the connection module 230, in one embodiment, controls the respective sensors to provide the data inputs in the form of the sensor data 250. Additionally, while the connection module 230 is discussed as controlling the various sensors to provide the sensor data 250, in one or more embodiments, the connection module 230 can employ other techniques to acquire the sensor data 250 that are either active or passive. For example, the connection module 230 may passively sniff the sensor data 250 from a stream of electronic information provided by the various sensors to further components within the vehicle 100. Moreover, the connection module 230 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

The connection module 230, in one embodiment, controls the sensors to acquire the sensor data 250 about an area that encompasses 360 degrees about the vehicle 100 in order to provide a comprehensive assessment of the surrounding environment. Of course, in alternative embodiments, the connection module 230 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Information may be shared between the lead vehicle and the following vehicle to re-engage the following mode. Such information may include identifying information about the lead vehicle and/or the following vehicle. For example, the lead and following vehicle may each transmit identifiers or sniff identifiers of the other vehicle to ensure a correct pairing. Specifically, the connection module 230 may transmit information to a following vehicle of the convoy and receive information from a following vehicle of the convoy.

Re-engagement may also include receiving sensor data from the following vehicle. Via the sensor data 250, vehicles can identify 1) the other vehicles of the convoy to which they are to re-pair and 2) the relative position of the other vehicles. That is, before the vehicles can re-engage in a following relationship, certain preconditions may be enforced. Examples include that the vehicles are within a predetermined distance, have a matched speed, and are within a threshold longitudinal alignment of one another, among others. Sensor data 250 from both vehicles is used to determine the relative position and movement of the vehicles. That is, using cameras and sensors of both the lead vehicle and the following vehicle, the convoy management system 170 creates a map of the surrounding environment. From this output, the convoy management system 170, alone or in combination with a system of the following vehicle, calculates a path to return the following vehicle to a position behind the lead vehicle.

During the re-engagement operation, one or more characteristics of the operation of the lead vehicle and/or the following vehicle may be altered. For example, the connection module 230 in the lead vehicle and/or the following vehicle may adjust the speed of respective vehicles such that the speeds of the two vehicles match. As another example, as a result of obstacle avoidance, the convoy vehicles may be in different lanes. In this example, the connection module 230 in the lead vehicle and/or the following vehicle may change the position of the respective vehicles such that the vehicles are longitudinally aligned. As such, the connection module 230 provides for the disengagement and re-engagement of a following mode of a convoy of virtually connected vehicles responsive to a detected obstacle avoidance event. As such, the convoy vehicles may avoid obstacles in an individualized fashion best suited for a particular vehicle without being constrained by the directing movement of another vehicle in the convoy.

In one approach, the connection module 230 implements and/or otherwise uses a machine learning algorithm. In one configuration, the machine learning algorithm is embedded within the connection module 230, such as a convolutional neural network (CNN), to perform following mode disengagement and re-engagement based on the sensor data 250 from which further information is derived. Of course, in further aspects, the connection module 230 may employ different machine learning algorithms or another suitable approach that generates an obstacle avoidance recommendation and execution. Whichever particular approach the connection module 230 implements, the connection module 230 provides for following mode disengagement and re-engagement. In this way, the connection module 230 selectively disengages and re-engages a following mode of a convoy based on a determination that some vehicle in the convoy is to execute obstacle avoidance measures.

In one or more configurations, the convoy management system 170 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the convoy management system 170 or another system generally trains the machine learning algorithm according to a particular training approach, which may include supervised training, self-supervised training, reinforcement learning, and so on. In contrast to training/learning of the machine learning algorithm, the convoy management system 170 implements the machine learning algorithm to perform inference. Thus, the general use of the machine learning algorithm is described as inference.

FIG. 3 illustrates a vehicle convoy and a convoy management system 170 that is associated with directing the convoy to avoid an obstacle 348. Specifically, FIG. 3 depicts a scenario described above where a following vehicle 344 is virtually connected, and in a following mode, with a lead vehicle 342 via a virtual connection 346. The lead vehicle 342 and the following vehicle 344 may each be an example of the vehicle 100 described above and may include components similar to those described above.

As depicted in FIG. 3, the different vehicles have different dimensions and capabilities. In the example depicted in FIG. 3, the lead vehicle 342 has a greater ground clearance than the following vehicle 344. As such, when the lead vehicle 342 detects an obstacle 348 that it can safely pass over, no specific obstacle avoidance may be initiated. The following vehicle 344, which travels the same path as the lead vehicle 342, would also not navigate around the obstacle 348. However, given the shorter ground clearance of the following vehicle 344, the obstacle 348 may strike the body of the following vehicle 344, which may damage the following vehicle 344 and/or endanger the passengers of the following vehicle 344.

As such, the convoy management system 170 described herein detects the obstacle 348 via the environment sensors 122 of the lead vehicle 342 and determines whether itself (e.g., the lead vehicle 342) or any other vehicle (e.g., the following vehicle 344) in the convoy should execute an obstacle avoidance measure to navigate around the obstacle 348. As described above, such a determination is based on the property data 255 and/or the sensor data 250 related to the vehicles in the convoy and the physical properties of the obstacle 348 as detected by the environment sensors 122 of the lead vehicle. When it is determined that the following vehicle 344 ground clearance will not allow the following vehicle 344 to pass over the obstacle 348 without incident, the convoy management system 170, and more specifically the connection module 230, may disengage the following mode of the convoy such that the lead vehicle 342 and the following vehicle 344 may be individually controlled to avoid the obstacle 348 as described above. This may include each vehicle determining whether to execute or not execute obstacle avoidance measures or may include each vehicle executing different obstacle avoidance measures.

Figure 4:
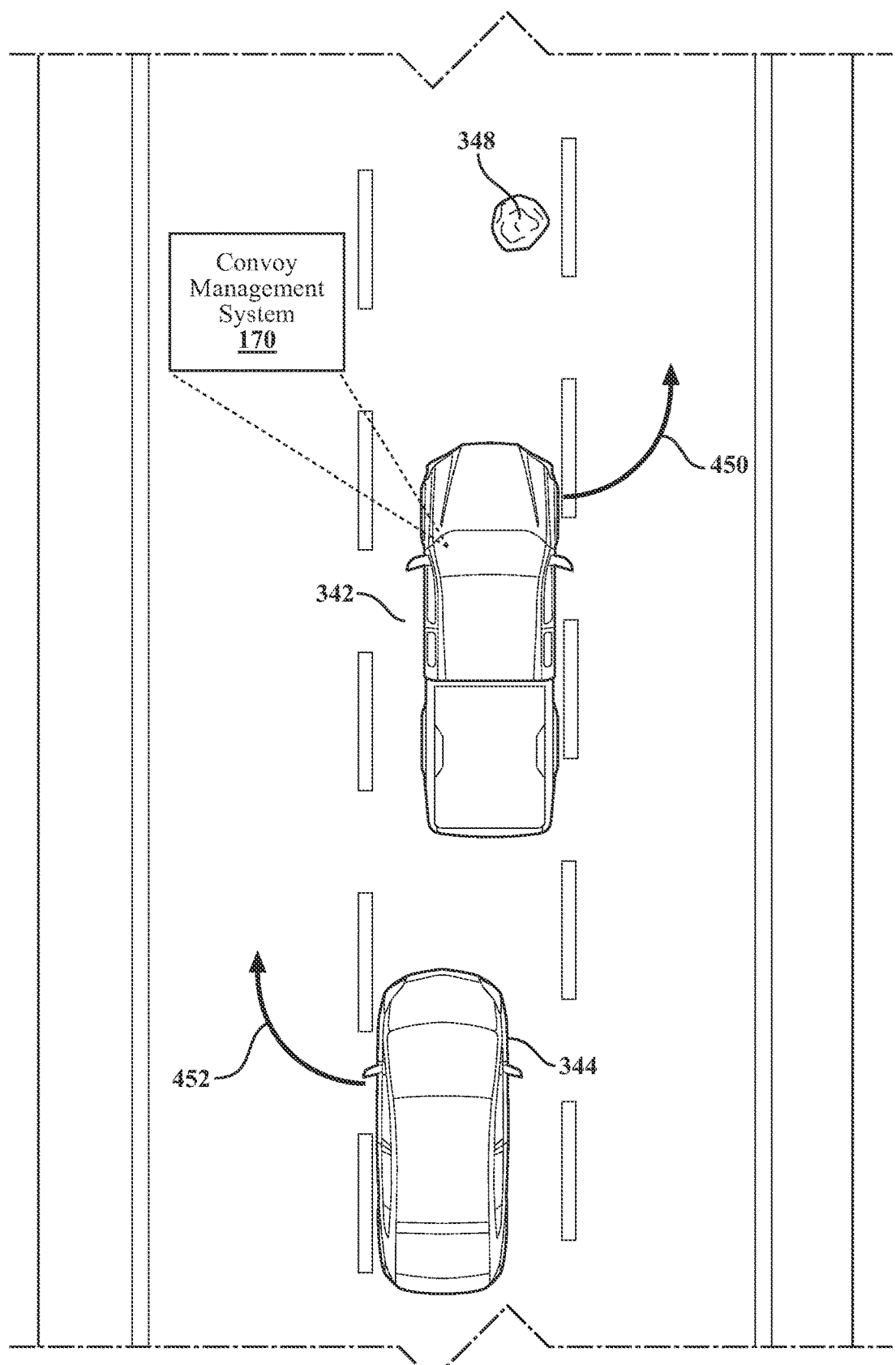
FIG. 4 illustrates a disengagement of a following mode of a vehicle convoy to avoid an obstacle.

FIG. 4 illustrates a disengagement of a following mode of a vehicle convoy to avoid an obstacle 348. As described above, it may be the case that both vehicles 342 and 344 execute obstacle avoidance measures, albeit different obstacle avoidance measures. For example, it may be that the obstacle 348 is positioned on the righthand side of a lane that the convoy is traveling in. The lead vehicle 342 may be adjacent to a righthand lane marker, while the following vehicle 344 may be adjacent to a lefthand lane marker. The driver of the lead vehicle 342 or an automated driving module 160 of the lead vehicle 342 may take a first navigation path 450 to avoid the obstacle 348. Were the following mode maintained, the following vehicle 344 would be directed to follow the same navigation path. Given the position of the following vehicle 344 further to the left, this may result in the following vehicle 344 colliding with the obstacle 348 rather than avoiding it.

As such, the convoy management system 170 disengages the following mode of the convoy such that the following vehicle 344 may follow a second navigation path 452, which is based on a property of the following vehicle 344 (i.e., its position within a lane) to avoid the obstacle 348 more effectively. Note that as described above, the second navigation path 452 may be identified via the manual input of a driver of the following vehicle 344, guidance generated by the convoy management system 170 and conveyed to the driver of the following vehicle 344, or via autonomous control of the following vehicle 344. As such, FIG. 4 illustrates that different vehicles in a convoy may execute different navigation strategies (in this case different navigation paths) to avoid a single obstacle 348 encountered by the convoy.

Figure 5:
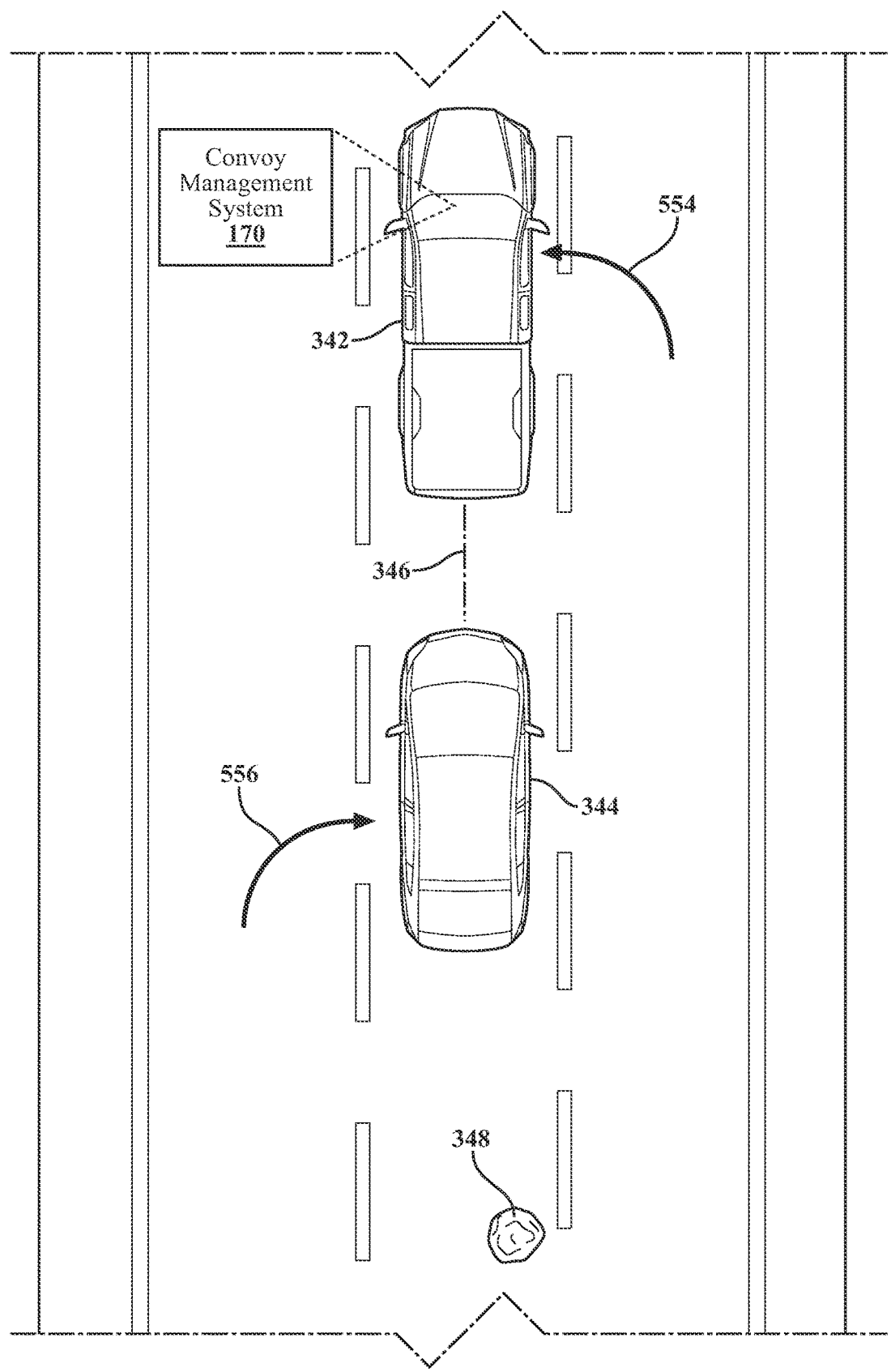
FIG. 5 illustrates a re-engagement of a following mode of a vehicle convoy following avoidance of an obstacle.

FIG. 5 illustrates a re-engagement of a following mode of a vehicle convoy following avoidance of an obstacle 348. As described above, once an obstacle 348 has been safely navigated, it may be desirable to re-establish the following relationship between the lead vehicle 342 and the following vehicle 344. As such, when the sensor systems 120 of the lead vehicle 342 and/or following vehicle 344 have identified that the convoy has passed the obstacle 348, the sensors and cameras of the lead vehicle 342 and the following vehicle 344 may cooperate to generate a map of the immediate surroundings of the convoy and align the vehicles with one another. As described above, this may include transmitting a variety of information to one another via the virtual connection 346, which information may include sensor data 250, identifying information for the vehicles, or any other type of information that is used to re-engage the following mode and align the vehicles with one another.

As described above, re-engagement of the following mode may include altering the operation of one or more of the lead vehicle 342 and the following vehicle 344. For example, as depicted in FIG. 4, the lead vehicle 342 and the following vehicle 344 may have taken different obstacle avoidance paths such that each is in a different lane of the road. As such, in this example, the lead vehicle 342 may be directed to take a first return path 554, and the following vehicle 344 may be directed to take a second return path 556, to align the vehicles with one another. Once these and other preconditions are met, such as a clear line of sight between the following vehicle 344 and the lead vehicle 342, a matched speed profile, and/or any number of other conditions, the connection module 230 may re-engage the following mode such that the following vehicle 344 again tracks the movement of the lead vehicle 342.

Figure 6:
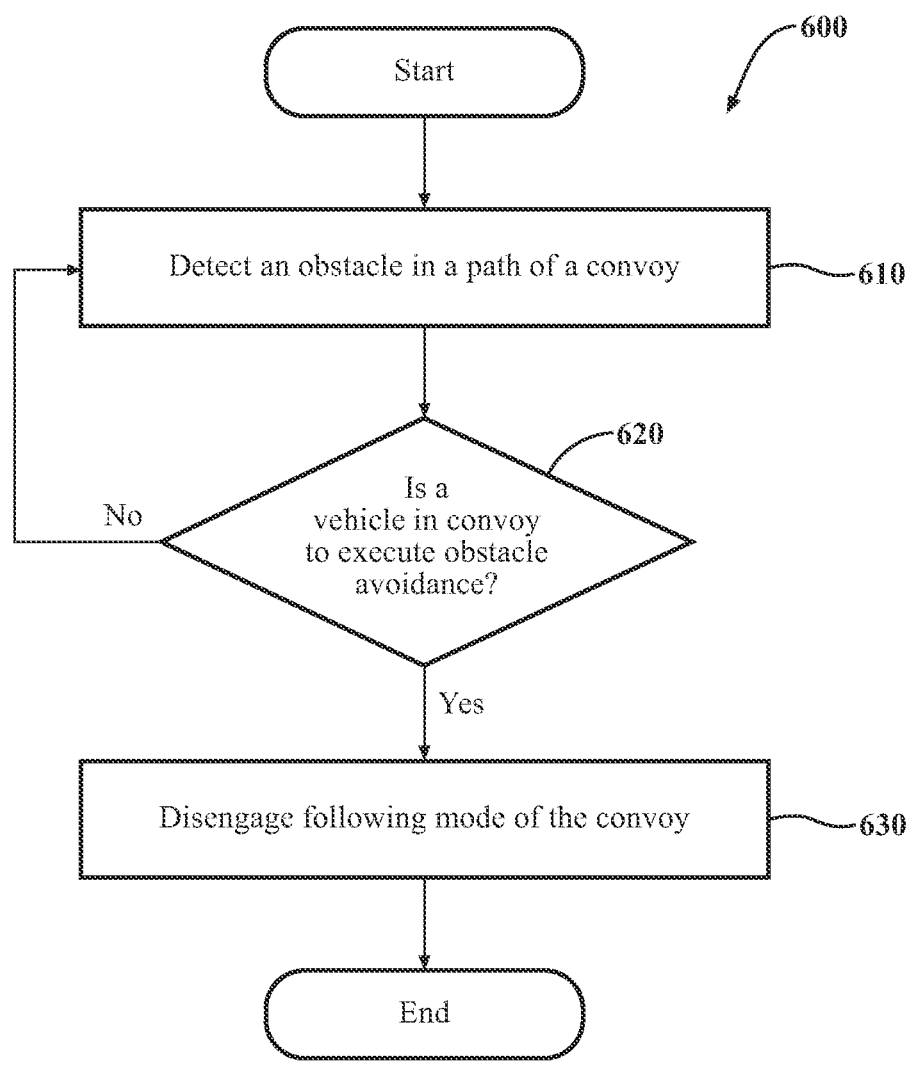
FIG. 6 illustrates a flowchart for one embodiment of a method that is associated with directing virtually connected vehicles to avoid an obstacle.

Additional aspects of convoy obstacle avoidance will be discussed in relation to FIG. 6. FIG. 6 illustrates a flowchart of a method 600 that is associated with managing a convoy's avoidance of an obstacle in the travel path of the convoy. Method 600 will be discussed from the perspective of the convoy management system 170 of FIGS. 1 and 2. While method 600 is discussed in combination with the convoy management system 170, it should be appreciated that the method 600 is not limited to being implemented within the convoy management system 170 but is instead one example of a system that may implement the method 600.

At 610, the obstacle avoidance module 220 detects an obstacle 348 in a path of a convoy of vehicles. In general, such obstacles 348 trigger obstacle avoidance maneuvers in an approaching vehicle. As such, the obstacle avoidance module 220 controls the sensor system 120 to acquire the sensor data 250, which sensor data 250 detects objects in the surrounding environment of the vehicle and convoy. In one embodiment, the obstacle avoidance module 220 controls the radar sensor 123 and the camera 126 of the vehicle 100 to observe the surrounding environment. Alternatively, or additionally, the obstacle avoidance module 220 controls the camera 126 and the LIDAR sensor 124 or another set of sensors to acquire the sensor data 250. As part of controlling the sensors to acquire the sensor data 250, it is generally understood that the sensors acquire the sensor data 250 of a region around the ego vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the obstacle avoidance module 220, in one embodiment, controls the sensors to acquire the sensor data 250 of the surrounding environment.

Moreover, in further embodiments, the obstacle avoidance module 220 controls the sensors to acquire the sensor data 250 at successive iterations or time steps. Thus, the convoy management system 170, in one embodiment, iteratively executes the functions discussed at blocks 610-620 to acquire the sensor data 250 and provide information therefrom. Furthermore, the obstacle avoidance module 220, in one embodiment, executes one or more of the noted functions in parallel for separate observations in order to maintain updated perceptions. Additionally, as previously noted, the obstacle avoidance module 220, when acquiring data from multiple sensors, fuses the data together to form the sensor data 250 and to provide for improved determinations of detection, location, and so on.

At 620, the obstacle avoidance module 220 determines that a vehicle in the convoy is to execute obstacle avoidance based on a property of a vehicle (e.g., dimension or capability) and a physical property of the obstacle 348. Specifically, the obstacle avoidance module 220 compares the dimensions, position, and/or movement of the obstacle 348 with the dimensions, movement, and/or operational capability of the vehicles in the convoy to determine whether any of the vehicles should execute obstacle avoidance. That is, the obstacle avoidance module 220 determines whether the size, shape, position, and potential movement of any obstacle 348 poses a danger to any vehicle in the convoy based on the dimensions and movement of the vehicles in the convoy.

If there is no impending danger, i.e., no vehicle in the convoy is to execute obstacle avoidance based on its individual dimensions or capabilities, the obstacle avoidance module 220 continues to monitor for obstacles 348 and determines whether or not other detected obstacles 348 trigger obstacle avoidance for any vehicle in the convoy.

If there is an impending danger, i.e., at least one vehicle in the convoy is to execute obstacle avoidance, at 630, the connection module 230 disengages the following mode of the convoy such that each vehicle in the convoy may individually navigate to avoid the obstacle 348 based on the individual dimensions and properties of the vehicle.

As described above, once an obstacle 348 has been avoided, the connection module 230 operates to re-engage the following mode of the convoy such that the following vehicle again tracks the movement of the lead vehicle. As such, the convoy management system 170 facilitates the individual and customized, rather than uniform, avoidance of obstacles that a vehicle convoy may encounter. In so doing, the convoy management system 170 bypasses the complications that may arise when vehicles of different dimensions and/or capabilities encounter an obstacle 348.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory.

Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. In general, the data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. Thus, the sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the convoy management system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the convoy management system 170, and/or the automated driving module(s) 160 may control some or all of these vehicle systems 140.

For example, when operating in the autonomous mode, the processor(s) 110, the convoy management system 170, and/or the automated driving module(s) 160 control the heading and speed of the vehicle 100. The processor(s) 110, the convoy management system 170, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 150 in at least one configuration. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 either independently or in combination with the convoy management system 170 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
    a processor; and
    a memory storing machine-readable instructions that, when executed by the processor, cause the processor to:
        detect an obstacle in a path of a convoy;
        at a lead vehicle, determine, per vehicle in the convoy, whether the vehicle in the convoy is to execute obstacle avoidance based on a property of the vehicle and a physical property of the obstacle; and
        disengage a following mode of the convoy responsive to a determination that the vehicle is to execute obstacle avoidance.

2. The system of claim 1, wherein:
    the property of the vehicle comprises at least one of:
        a dimension of the vehicle;
        an operational capability of the vehicle; or
        a position of the vehicle; and
    the physical property of the obstacle comprises at least one of:
        a dimension of the obstacle;
        a position of the obstacle; or
        a movement of the obstacle.

3. The system of claim 1, wherein the machine-readable instructions further comprise a machine-readable instruction that, when executed by the processor, causes the processor to re-engage the following mode when the convoy has passed the obstacle.

4. The system of claim 3, wherein the machine-readable instruction that, when executed by the processor, causes the processor to re-engage the following mode when the convoy has passed the obstacle comprises at least one of:
    a machine-readable instruction that, when executed by the processor, causes the processor to share information with a second vehicle of the convoy;
    a machine-readable instruction that, when executed by the processor, causes the processor to alter operation of vehicles of the convoy; or
    a machine-readable instruction that, when executed by the processor, causes the processor to calculate a return path of a following vehicle to a position behind the lead vehicle.

5. The system of claim 1, wherein the machine-readable instructions further comprise a machine-readable instruction that, when executed by the processor, causes the processor to collect data indicating properties of vehicles in the convoy during initialization of the convoy.

6. The system of claim 1, wherein the machine-readable instructions further comprise a machine-readable instruction that, when executed by the processor, causes the processor to transmit the physical property of the obstacle to a following vehicle such that the following vehicle executes obstacle avoidance based on a property of the following vehicle and the physical property of the obstacle.

7. The system of claim 1, wherein the machine-readable instructions further comprise a machine-readable instruction that, when executed by the processor, causes the processor to transmit, from the lead vehicle, obstacle avoidance commands for a following vehicle to the following vehicle based on a property of the following vehicle.

8. The system of claim 7, wherein the machine-readable instructions further comprise a machine-readable instruction that, when executed by the processor, causes the processor to generate the obstacle avoidance commands for the following vehicle based on the property of the following vehicle and the physical property of the obstacle.

9. The system of claim 7, wherein the machine-readable instruction that, when executed by the processor, causes the processor to transmit, from the lead vehicle, the obstacle avoidance commands for the following vehicle to the following vehicle based on the property of the following vehicle comprises a machine-readable instruction that, when executed by the processor, causes the processor to transmit, from the lead vehicle, the obstacle avoidance commands for the following vehicle to the following vehicle that are different from obstacle avoidance commands for the lead vehicle in the convoy.

10. The system of claim 1, wherein the machine-readable instructions further comprise a machine-readable instruction that, when executed by the processor, causes the processor to transmit a dimension of the obstacle to a following vehicle such that the following vehicle executes obstacle avoidance based on a property of the following vehicle and the dimension of the obstacle.

11. The system of claim 1, wherein the machine-readable instructions further comprise a machine-readable instruction that, when executed by the processor, causes the processor to re-engage the following mode when the convoy has passed the obstacle by:

transmitting, from a lead vehicle, an identifier of the lead vehicle;

receiving, from a following vehicle, an identifier of the following vehicle, wherein verification of identifiers triggers vehicle control in the convoy; and determining that the lead vehicle and the following vehicle:
are within a predetermined distance of one another;
have a matched speed; and
are within a longitudinal alignment of one another.

12. A non-transitory machine-readable medium comprising instructions that, when executed by a processor, cause the processor to:
detect an obstacle in a path of a convoy;
at a lead vehicle, determine, per vehicle in the convoy, whether the vehicle in the convoy is to execute obstacle avoidance based on a property of the vehicle and a physical property of the obstacle; and
disengage a following mode of the convoy responsive to a determination that the vehicle is to execute obstacle avoidance.

13. The non-transitory machine-readable medium of claim 12, wherein the instructions further comprise an instruction that, when executed by the processor, causes the processor to collect data indicating properties of vehicles in the convoy during initialization of the convoy.

14. The non-transitory machine-readable medium of claim 12, wherein the instructions further comprise an instruction that, when executed by the processor, causes the processor to transmit obstacle avoidance commands for a following vehicle to the following vehicle based on a property of the following vehicle.

15. The non-transitory machine-readable medium of claim 14, wherein:
the instructions further comprise an instruction that, when executed by the processor, causes the processor to generate the obstacle avoidance commands for the following vehicle based on the property of the following vehicle and the physical property of the obstacle; and
the obstacle avoidance commands for the following vehicle are different from obstacle avoidance commands for the lead vehicle in the convoy.

16. A method, comprising:
detecting an obstacle in a path of a convoy;
at a lead vehicle, determining, per vehicle in the convoy, whether the vehicle in the convoy is to execute obstacle avoidance based on a property of the vehicle and a physical property of the obstacle; and
disengaging a following mode of the convoy responsive to a determination that the vehicle is to execute obstacle avoidance.

17. The method of claim 16, further comprising re-engaging the following mode when the convoy has passed the obstacle.

18. The method of claim 16, further comprising collecting data indicating properties of vehicles in the convoy during initialization of the convoy.

19. The method of claim 16, further comprising transmitting the physical property of the obstacle to a following vehicle such that the following vehicle executes obstacle avoidance of the obstacle based on a property of the following vehicle and the physical property of the obstacle.

20. The method of claim 16, further comprising generating and transmitting obstacle avoidance commands for a following vehicle to the following vehicle based on a property of the following vehicle and the physical property of the obstacle, wherein the obstacle avoidance commands for the following vehicle are different from obstacle avoidance commands for the lead vehicle in the convoy.

* * * * *